United States Patent [19]

Fikacek

[11] Patent Number: 5,406,770
[45] Date of Patent: Apr. 18, 1995

[54] PACKAGING APPARATUS FOR RANDOM SIZE ARTICLES

[76] Inventor: Karel J. Fikacek, 22924 Detour, St. Clair Shores, Mich. 48082

[21] Appl. No.: 66,586

[22] Filed: May 24, 1993

[51] Int. Cl.$^6$ .......................... B65B 57/10; B65B 5/10
[52] U.S. Cl. .......................................... 53/54; 53/155; 53/238; 53/495; 53/502
[58] Field of Search ............... 53/54, 495, 498, 504, 53/502, 500, 544, 238, 237, 155, 55, 53, 77

[56] References Cited

U.S. PATENT DOCUMENTS

| | | | |
|---|---|---|---|
| 3,678,660 | 7/1972 | Musser | 53/391 X |
| 3,872,644 | 3/1975 | Giraudi et al. | 53/504 X |
| 4,018,031 | 4/1977 | Smaw | 53/258 X |
| 4,584,821 | 4/1986 | Booth | 53/448 |
| 4,809,187 | 2/1989 | Adams | 53/502 |
| 4,909,356 | 3/1990 | Rimondi et al. | 53/504 X |
| 5,105,600 | 4/1992 | DePoint, Jr. et al. | 53/238 X |
| 5,138,817 | 8/1992 | Mowry et al. | 53/504 X |
| 5,191,749 | 3/1993 | Cappi et al. | 53/502 |

Primary Examiner—James F. Coan
Attorney, Agent, or Firm—Alex Rhodes

[57] ABSTRACT

An automated interative apparatus for packaging random assortments of random size and shaped articles comprising a group of stations in seriatum for processing and packaging random assortments of random size and shape articles. The stations include: at least one station for loading and separating articles into orders; a scanning station for scanning and entering into a computer indicia on articles; a weighing station; a rejection station for rejecting mismarked, out of date or recalled articles; an orientation station for angularly orienting articles; a packaging station for loading articles into packages; a sealing station for sealing cartons and a computer having a program for interacting with the stations to process and package articles and a data file corresponding to indicia marked on each of the articles.

19 Claims, 8 Drawing Sheets

PACKAGING APPARATUS FOR RANDOM SIZE ARTICLES

BACKGROUND OF THE INVENTION

This invention relates to packaging and more particularly to an automated interactive apparatus for processing and packaging of dissimilar articles.

Processing and packaging random size articles requires substantial amounts of labor and adds to the cost of doing business. Cost control is important for the profitable operation of manufacturing plants, warehouses, supermarkets, mail order businesses, and the like.

One deficiency of existing apparatus for automated processing and packaging articles is that they are only capable of processing and packaging similar articles. Booth U.S. Pat. No. 4,584,821 and Smaw U.S. Pat. No. 4,018,031 are exemplary of the existing art. Booth discloses an apparatus for packaging similar size fruit in honeycomb structures. Smaw U.S. Pat. No. 4,018,031 discloses an apparatus for packaging similar size paper products such as toilet tissue, napkins and towels in cartons.

SUMMARY OF THE INVENTION

The present invention is an automated interactive apparatus for processing and packaging dissimilar articles. The invention is intended to reduce labor costs in manufacturing plants, warehouses, supermarkets, mail order businesses, and the like.

The invention resides in a number of features which individually and collectively contribute to its ability to reduce the costs of processing and packaging of random assortments of dissimilar articles.

One benefit of the invention, in addition to packaging assortments of dissimilar articles, is that recalled and expired articles are automatically rejected.

Another benefit, in addition to the foregoing benefit, is that inventory and sales records are continuously updated. The updated records are useful to support management decisions and to support "just in time" inventories of articles.

Another benefit, in addition to the foregoing benefits, is that theft is reduced.

Another benefit, in addition to the foregoing benefits, is that invoices are automatically generated.

Another benefit, in addition to the foregoing benefits, is that time is reduced for filling orders. The reduced time increases customer good will and increases the utilization of business facilities.

In addition to the foregoing immediate benefits, it is believed that the invention will promote the adoption of standardized packages for further reducing the cost of doing business.

The invention is broadly comprised of a computer which interacts with a packaging and record generation apparatus. The packaging and record generation apparatus is comprised of a series of stations through which dissimilar size articles pass and are inspected, oriented packages and records are generated and updated. Theft is reduced by restricting the pick-up and payment of orders to areas which are separate from public shopping and order processing areas.

Another benefit of my invention is that the interactive system can be integrated with telephone ordering systems whereby orders can be placed, automatically processed and packaged, and delivered to customers at car pick-up stations.

In the first aspect of the invention, dissimilar size articles are automatically packaged after being inspected, and invoiced and business records are automatically updated. Optional size cartons are automatically provided for small and large orders. In a second aspect of the invention, articles are automatically processed but manually loaded into packages.

Further benefits and features of the invention will be apparent from the ensuing description and accompanying drawings which describe the invention in detail. A preferred embodiment is disclosed in accordance with the best mode which is contemplated for practicing the invention and the specific features in which exclusive property rights are claimed are set forth in each of the numbered claims which are appended to the detailed description.

DETAILED DESCRIPTION OF THE PREFERRED EMBODIMENT

Referring now to the drawings wherein like numerals designate like and corresponding parts throughout the several views, in FIGS. 1 through 16, inclusive, an apparatus for automatically processing and packaging dissimilar articles is shown in schematic form for purposes of illustrating the invention. The apparatus, generally designated by the numeral 20, is intended to be used in super markets, manufacturing plants, warehouses, mail order businesses, and the like.

The broad concept of the invention is to automatically process and package random size articles with an interactive system comprised of a computer and an electro-mechanical apparatus. During the processing and packaging, indicia such as UPC numbers on articles are scanned and entered into the computer. Stored data files are recalled from memory to the computer's central processing unit (CPU) and used to control the processing and packaging of the articles. During the processing, adjustments are automatically made by the computer to compensate for rejected articles.

In the first aspect of the invention which is depicted in FIGS. 1 through 16, inclusive, the computer interacts with the electro-mechanical apparatus to 1) weigh non pre-packaged articles; 2) reject unmarked, mismarked, recalled and expired articles; 3) package articles; 4) update price, sales and inventory records; and 5) generate sales and inventory summary records. It is contemplated that in some businesses the computer will be operatively connected to a network of conventional display terminals at remote locations to supply management with current sales and inventory data.

Figure 1:
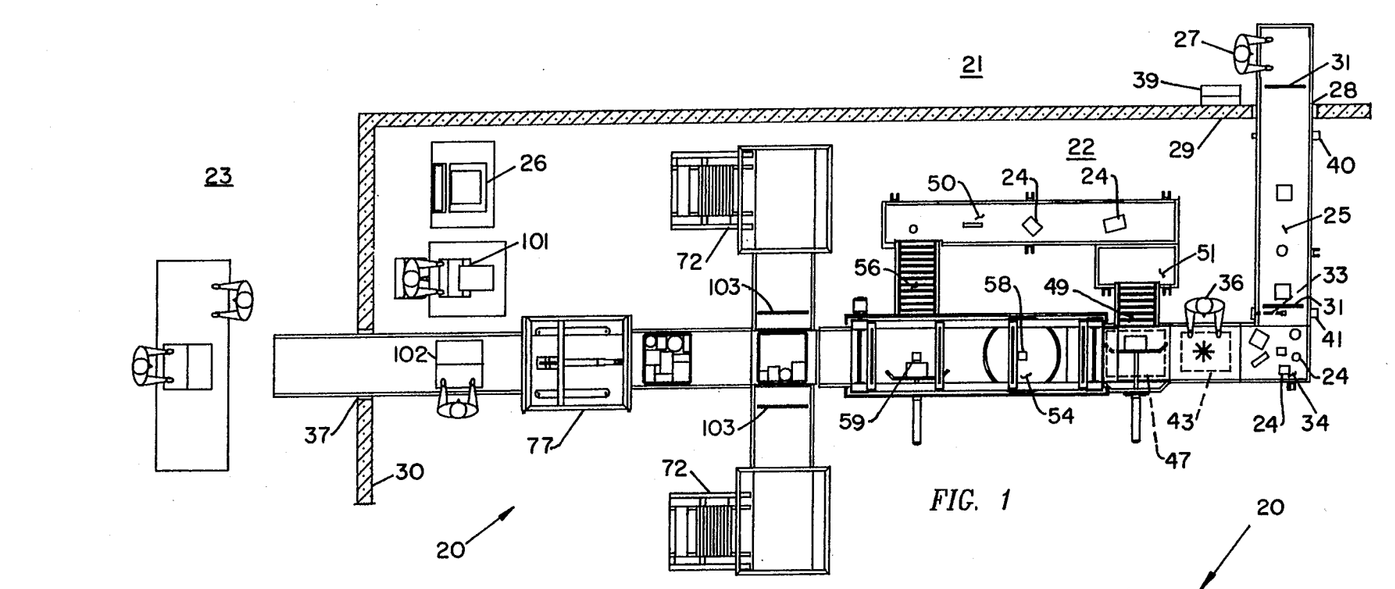
FIG. 1 is a plan view of an apparatus for processing and packaging random assortments of dissimilar size articles in accordance with the present invention.
Figure 2:
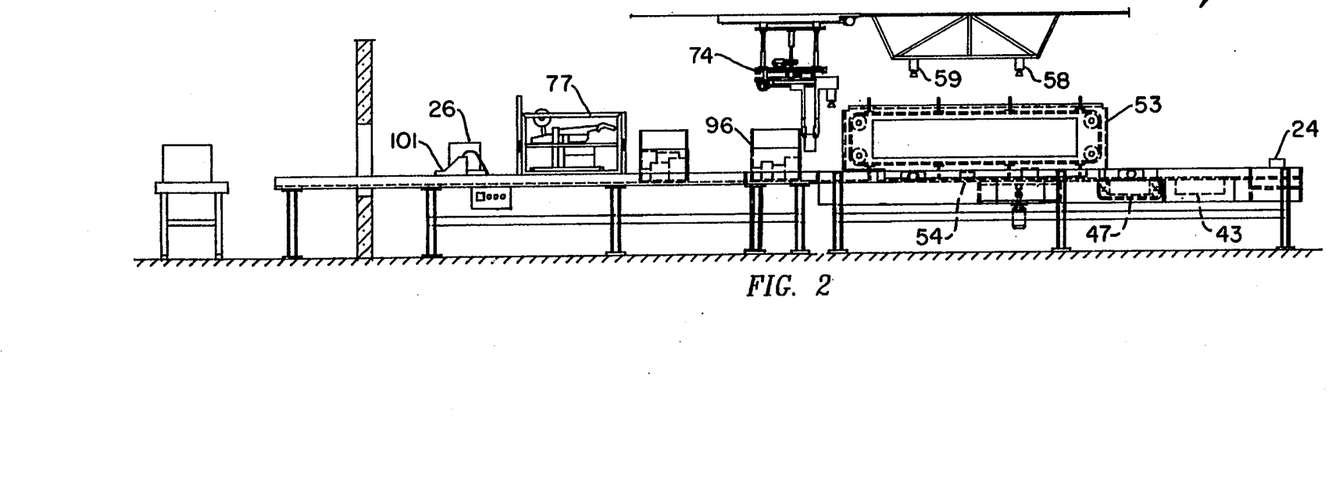
FIG. 2 is a side elevational view of the processing and packaging apparatus.

The overall concept of the invention is best understood by referring to FIGS. 1 and 2. The business, depicted therein, is divided into three separate zones, namely, a public shopping zone 21, an employee order processing and packaging zone 22, and a customer order pick-up zone 23. The zones are restricted areas whereby the public is denied access to the processing and packaging zone. Management has an option of limiting the access of certain employees to the processing and packaging zone.

In some businesses, for example, warehouses, the initial zone is a stock room in lieu of the public shopping zone. The purpose of dividing the business into three zones is to reduce theft by preventing the public from removing articles from public shopping areas. It will be understood that the division of a business into zones is a preferable but not mandatory requirement of my invention.

Articles 24 enter the apparatus in the public zone 21, are processed and packaged in the processing and packaging zone 22 and picked-up and paid for in the pick-up zone 23. The articles 24 are transported on conventional elevated power driven belt conveyors and pass through separate stations which are operatively connected to a computer 26. The computer 26 interacts with the separate stations to accomplish the enumerated tasks.

Initially, articles 24 are loaded on to a belt conveyor 25 by a customer 27 in the shopping area 21 or by an employee in the instance of the stock room. The belt conveyor 25 passes through an opening 28 in a wall 29 into the processing and packaging area 22 where the articles 24 are scanned and UPC numbers in bar code form are digitized and entered into the computer 26. Data files which match the articles' UPC numbers are recalled from memory and entered into the computer's central processing unit. The UPC number and data from overhead imaging cameras (later described) are used by the computer's central processing unit (CPU) in combination with the stations to remove unmarked, mismarked, recalled and expired articles; to package articles; to update sales and inventory records; and print out invoices and other business records.

It is contemplated that in most instances UPC numbers which are applied by manufacturers will be sufficient for the present invention. For articles such as meats, fresh fruits and vegetables (i.e. other than prepackaged articles), it is contemplated that UPC numbers on labels will be applied by employees or customers at points of selection in the public shopping zone.

After orders have been processed, packaged and marked, they pass from the processing and packaging zone 22 through an opening 37 in a second wall 30 into the order pick-up zone 23 where payment is made and orders picked up by customers.

THE LOAD STATION

Figures 3, 4:
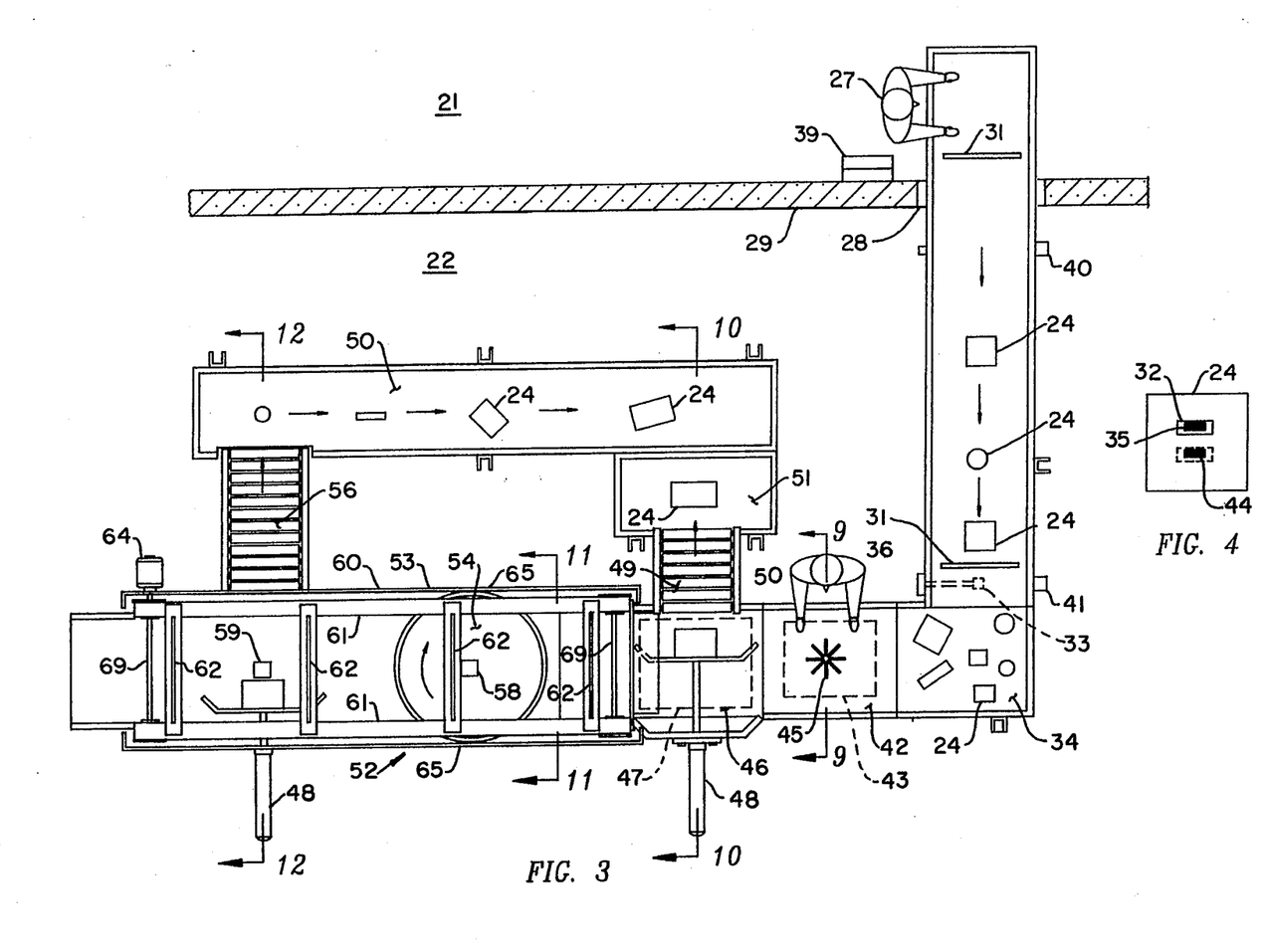
FIG. 3 is an enlarged view of a loading station, scanning station, weighing station and angular orientation station.
FIG. 4 is an enlarged plan view of an article.

Referring now to FIG. 3, the load station 38 is comprised of the usual type power driven belt conveyor 25 and an order separating means. Although a single conveyor 25 is depicted in the drawings, it will be appreciated that multiple conveyors 25 can be provided for processing greater numbers of orders.

The belt conveyor 25 is partly in the public shopping area 21 and partly in the processing and packaging area 22. The order separating means is comprised of a plurality of magnetic separator bars 31, order identification labels 32, a magnetic sensor 33 and a stationary table 34. Before the first article 24 is placed on the conveyor, one of the separator bars 31 is placed on the conveyor by the customer 27 to establish the beginning of the order.

Before the last article 24 is placed on the conveyor 25, one of the order labels 32 is applied to the last article 24 by the customer 27 to establish the end of the order. As shown in FIG. 4, the order number is marked on the label 32 in a bar code 35. The bar code 35 is later read and entered into the computer 26 by an imaging camera 59 or a usual type scanning device (not shown) just prior to packaging the last article 24 of the order. A record, e.g. a card, identifying the order number is retained by the customer 27 to identify and pick up the order in the pick-up zone 23.

Each article 24 preferably has a conventional antitheft strip (not shown) which sets off an alarm if the article 24 is removed from the public shopping area 21.

After the articles 24 enter the processing and packaging zone 22, they are transported and deposited on the stationary table 34 by the conveyor 25. When a magnetic separating bar 31 passes a sensor 33 in the belt conveyor 25, the conveyor 25 stops.

The sensor 33 is preferably a Hall effect or a magneto-resistive type transducer. The Hall effect transducer 33 produces a voltage in the presence of the magnetic bar 31. The voltage is amplified and actuates a conventional relay control (not shown) to stop the belt conveyor 25. Hall effect sensors are available from Micro Switch, a Division of the Honeywell Company. The separator bar 31 is removed by an employee after the last article 24 has been scanned to set load conveyor 25 in motion.

In FIGS. 1, 2 and 3, an alternate order separator means is also shown. The alternate separator means is comprised of a key-pad terminal 39 for entering the customer's name and mark the beginning of an order, and conventional photocell type counters 40, 41 for counting the articles 24 and stopping the load conveyor 25 after the last article 24 of an order is deposited on the stationary table 34.

Article counting in the alternate order separator means is performed by the photocell counter 40 at the forward portion of the load conveyor 25 and entered into the computer 26. When the last article 24 passes the photocell counter 41 at the end of the load conveyor 25, the conveyor 25 stops and remains stopped until the order is completely scanned at the next in line scanning station 42.

THE SCANNING STATION

The next in line scanning station 42 is comprised of an optical character reader (OCR) 43. Articles 24 from the stationary table 34 are manually passed by the employee 36 over the OCR 43 with bar codes 44 facing the window 45 of the OCR 43. The OCR 43 is preferably similar to the laser scanners used at point of sale terminals. Alternatively, a conventional magnetic-ink character recognition reader (MICR), commonly used for scanning codes on checks and postal money orders can be used.

After articles 24 are manually passed over the OCR 43 by the employee 36 to read, digitize and enter their UPC numbers in the computer 26, they are deposited on the next in line weighing station 46. If a UPC number is missing or a marking is defective, the article is still deposited on the weighing station for rejection.

It will be appreciated that when package size, package shape and bar code location are improved and standardized, it is contemplated that the stationary table 34 and employee 36 will not be necessary and that articles 34 will be automatically passed through the scanning station.

THE WEIGHING STATION

With reference to FIGS. 3 and 4, the next in line weighing station 46 is comprised of a conveyor weight scale 47, a pneumatic rejection cylinder 48, an inclined roller conveyor 49, a moving belt conveyor 50 and a rejection table 51. When an article 24 is placed on the conveyor scale 47, the article 24 is weighed and its weight is entered into the computer 26. Prices of articles 24 such as fresh fruit and vegetables are calculated in the computer 26 and held in memory together with prices of other articles 24 for later developing invoices and sales records. In addition, weights of other articles 24 are matched against their weights in corresponding data files to determine whether the articles have been mismarked.

If the computer 26 determines from the weight 46 and scanning 42 stations that an article 24 is unmarked, mismarked, recalled or expired, the belt of the conveyor weight scale 47 stops and the article 24 is moved from the weight scale 47 by the rejection cylinder 48 and deposited in the rejection table 51 via the inclined roller conveyor 49 and belt conveyor 50.

The conveyor scale 47 is a conventional unit for weighing articles in motion. One suitable unit is manufactured by Weight-Tronix, Inc. of Fairmont, Minn. The scale is a fully automated dual photocell scale with a full scale accuracy of 0.1 percent. The conveyor belt is driven by an electric motor and is capable of a linear speed of 100 feet per minute. Two models are available; one with a capacity of 100 pounds and the other of 200 pounds.

When an article 24 is rejected, its invoice and the inventory and sales records are adjusted by the computer to compensate for its rejection. If the measured weight is within the weight range for the article 24 in its computer's data file, and the article 24 is neither outdated nor subject to recall, the article 24 is advanced to the next in line station, namely, the orientation station 52.

ORIENTATION STATION

Referring now to FIGS. 2 and 3, the next in line orientation station 52 is comprised of an overhead transporter assembly (OTA) 53, a rotary table 54, an electric drive motor 55 for rotating the table 54, a rejection cylinder 48, a roller conveyor 56, and two overhead imaging cameras (OIC) 58, 59. One OIC 58 is directly over the rotary table 54 and the other OIC 59 is aligned with the rejection cylinder 48. The first OIC 58 cooperates with the computer 26 to control the movements of the OTA 53 and rotary table 54. The second imaging camera 59 inspects the angular orientation of an article 24 after it has been aligned and reads the bar coded order number 35 on the bar code label 32 of the last article 24 of the order.

The OTA 53 is comprised of a frame 60, pair of spaced apart endless rubber cog belts 61, a plurality of T-section pusher blades 62, four sprockets 63 and an electric drive motor 64. The frame 60 has a pair of rectangular sides 65 which are attached at their lower edge portions to the sides of the structure which supports the rotary table 54. The cog belts 61 are inwardly adjacent to the frame sides 65 and engage the sprockets 63 which are mounted at the corners of the frame 60. The cog belts 61 are interconnected by the ends of the pusher blades 62 such that the belts 61 and pusher blades 62 advance as a unit to move articles 24 on and off the rotary table 54.

The T-section pusher blades 62 are equally spaced around the top 66, sides 67 and bottom 68 portions of the endless cog belts 61. The sprockets 63 are fixedly mounted on the ends of lateral shafts 69 which are pivotally mounted in the frame sides 65. The drive motor 64 is connected to an end portion of one of the shafts 69 and when actuated advances the belts 61 and pusher blades 62 in the direction of arrows "A".

Figure 5:
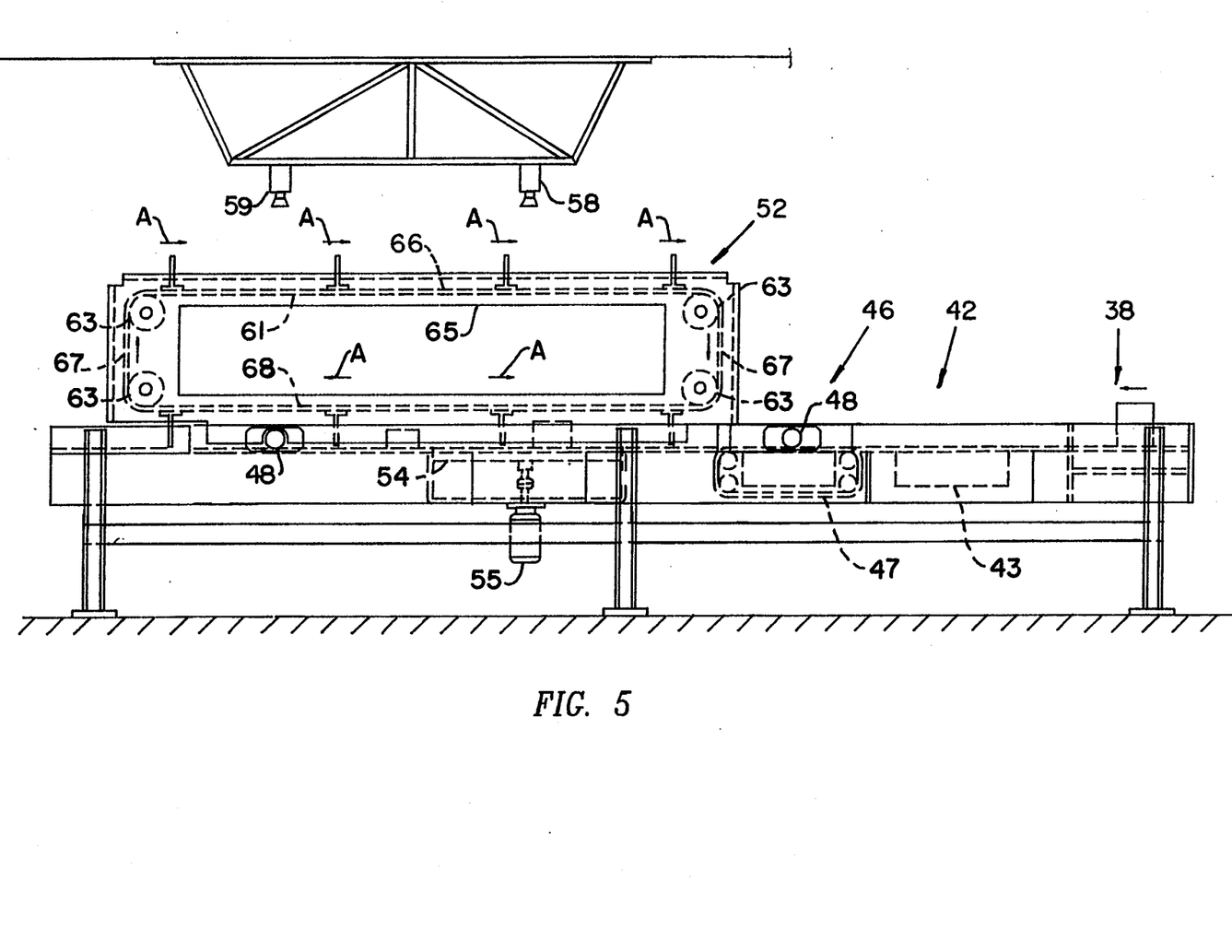
FIG. 5 is a left end elevational view of the loading station, scanning station, weighing station and angular orienting station shown in FIG. 3.

With reference to FIG. 5, the T-section pusher blades 62 at the bottom portions 68 of the cog belts 61, extend vertically downward to a short distance above the rotary table 54 to move articles on and off the rotary table 54 and through the orientation station 52.

After an article 24 is moved on to the rotary table 54, the article's image is picked up by the first OIC 58, digitized, and entered into the computer 26. Via a signal from the computer 26, the OTA 53 stops and the rotary table 54 begins to rotate to align the article 24 in accordance with an image in the computer 26.

When the article's angular orientation, as viewed by first OIC 58, coincides with an image as stored in the computer 26, via a signal from the computer 26, rotation of the rotary table 54 stops, motion of the OTA 53 is started and the article 24 is moved to a position opposite the rejection cylinder 48.

If the angular orientation of the article, as viewed by the second OIC 59, is improper, the article 24 is moved laterally by the pneumatic rejection cylinder 48 and advanced by the roller conveyor 56 and moving belt conveyor 50 to a position adjacent to the rejection table 51 for re-entry and re-processing. If a rejected article 24 is the last article 24, an adjustment is made by the computer 26 whereby other orders will not be affected.

If the angular orientation is found to be proper, the OTA is again set in motion and the article 24 is advanced to the end of the orientation station for packaging into a carton.

PACKAGING STATION

With reference to FIGS. 6, 7, 13–16, the next in line packaging station 70 is comprised of a stationary table 71, a pair of carton erectors 72, a pair of carton conveyors 73, a robot 74, a third OIC 75, a full carton conveyor 76, and a carton sealer and order marker 77. A third OIC camera 75 and computer 26 control the robot 74, the movement of empty and full cartons and the sealing and marking of cartons.

Figure 6:
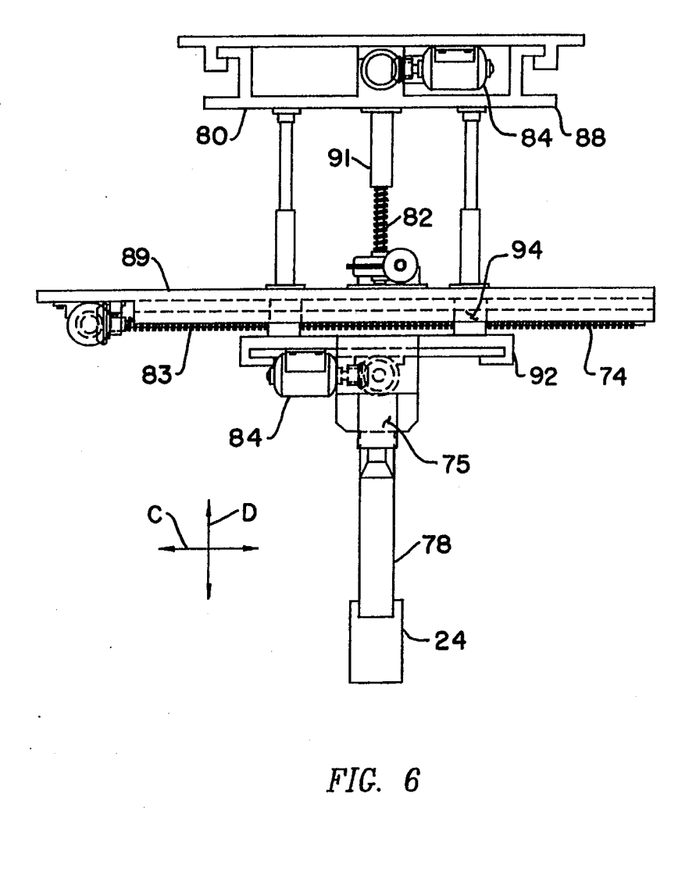
FIG. 6 is an enlarged front elevational view of a robot for loading articles into cartons.
Figure 7:
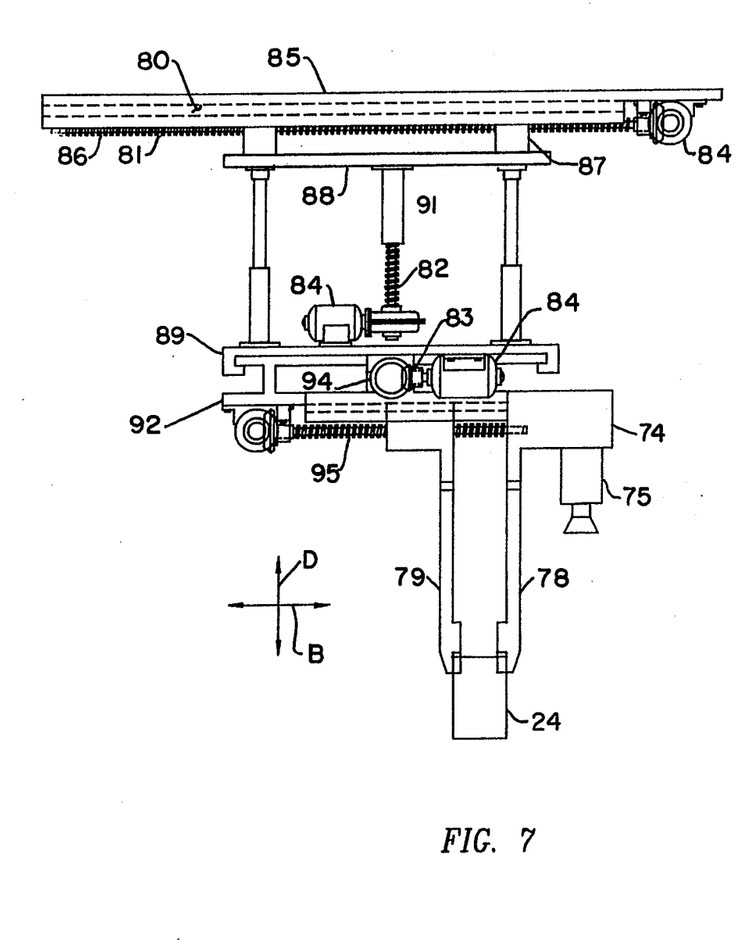
FIG. 7 is a side elevational view of the robot shown in FIG. 6.
Figure 8:
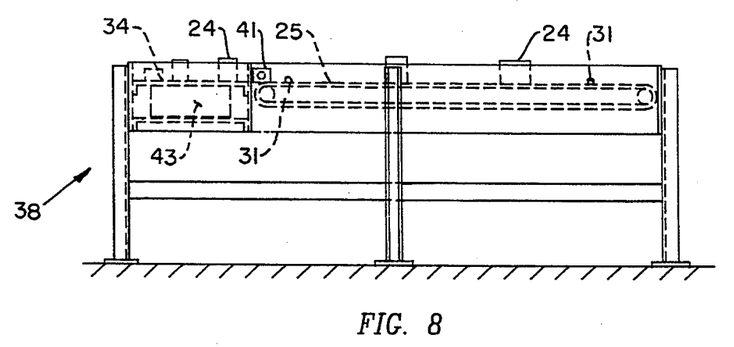
FIG. 8 is an enlarged right elevational view of the article loading station.
Figure 9:
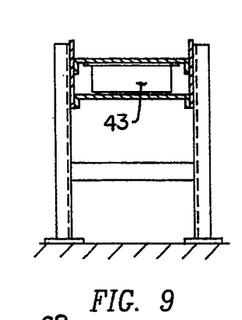
FIG. 9 is an enlarged cross-sectional view taken on the line 9—9 in FIG. 3.
Figure 10:
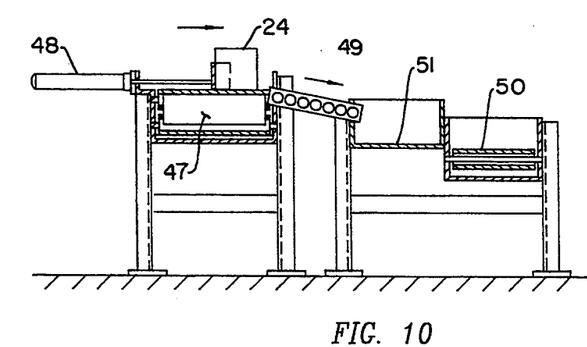
FIG. 10 is a cross-sectional view taken on the line 10—10 in FIG. 3.
Figure 11:
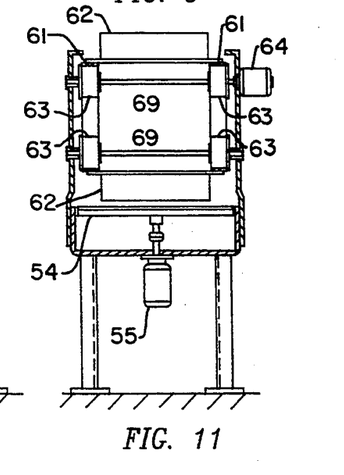
FIG. 11 is a cross-sectional view taken on the line 11—11 in FIG. 3.
Figure 12:
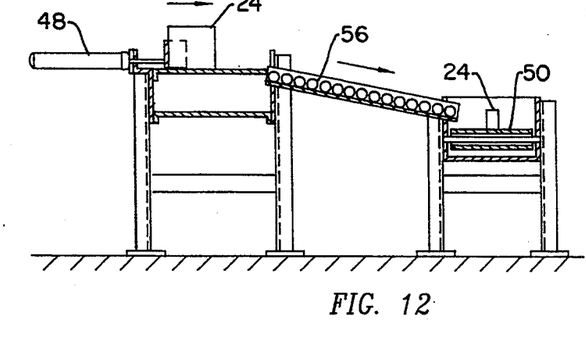
FIG. 12 is an enlarged cross-sectional view taken on the line 12—12 in FIG. 3.

The construction of the robot 74 is best understood by reference to FIGS. 6 and 7. The robot 74 is comprised of a stationary arm 78, a movable arm 79, a right angle drive 95 for moving the movable arm 79 toward the stationary arm 78 to grasp articles 24, and an overhead carriage 80 for moving the robot arms 78, 79 in the longitudinal "B" lateral "C" and vertical "D" directions.

A means for moving the robot arms 78, 79 consists of three conventional right angle power screw drives. In the embodiment shown in the drawings, an upper power screw drive 81 moves the robot arms 78, 79 in the longitudinal direction; an intermediate power screw drive 82 raises and lowers the robot arms 78, 79 in the vertical direction, and a lower power screw drive 25 moves the arms 78, 79 in the lateral direction. Each drive has an electric drive motor 84 for rotating its power screw.

The longitudinal power screw drive 81 and drive motor 84 are mounted on a plate 85 which is fixed to a building structure (not shown). The longitudinal power screw 86 threadably engages a bushing 87 which is mounted in a plate 88 which moves longitudinally when the longitudinal screw 86 is rotated by the corresponding electric motor 84.

The vertical power screw drive 82 and motor 84 are mounted on a plate 89 which is spaced apart from the longitudinal drive plate 88. The vertical drive screw 90 threadably engages a bushing 91 which is mounted on the plate 88 and causes the plate 89 to be raised and lowered when the vertical screw 90 is rotated by the corresponding drive motor 84.

The lateral power screw drive 83 and motor 84 are mounted on a plate 92 which slideably engages the plate 89. A lateral drive screw 93 threadably engages a bushing 94 which is mounted on the vertical drive plate 89, When the lateral drive screw 93 is rotated, the robot arms 78, 79 move laterally.

After an article 24 is moved by the OTA 53 to the end of the orientation station 52, the longitudinal drive 81 and lateral drive 83 are set into motion via a signal from the computer 26 and the robot arms 78, 79 are positioned by the OIC 75 and computer 26 directly above the article 24 for a pick-up.

During the pick-up, the vertical drive plate 89 is lowered to straddle the article 24 with the robot arms 78, 79. The movable arm 79 is then moved towards the fixed arm 78 by a right angle power screw drive 95 which is mounted to the lateral drive plate 92 to grasp the article 24. The arms 78, 79 and article 24 are then raised by the vertical power screw drive 82 and positioned by the OIC 75, computer 26, longitudinal power screw drive 81, and lateral power screw drive 83 directly over a carton 96 which is supported on the fixed table 71.

Figure 16:
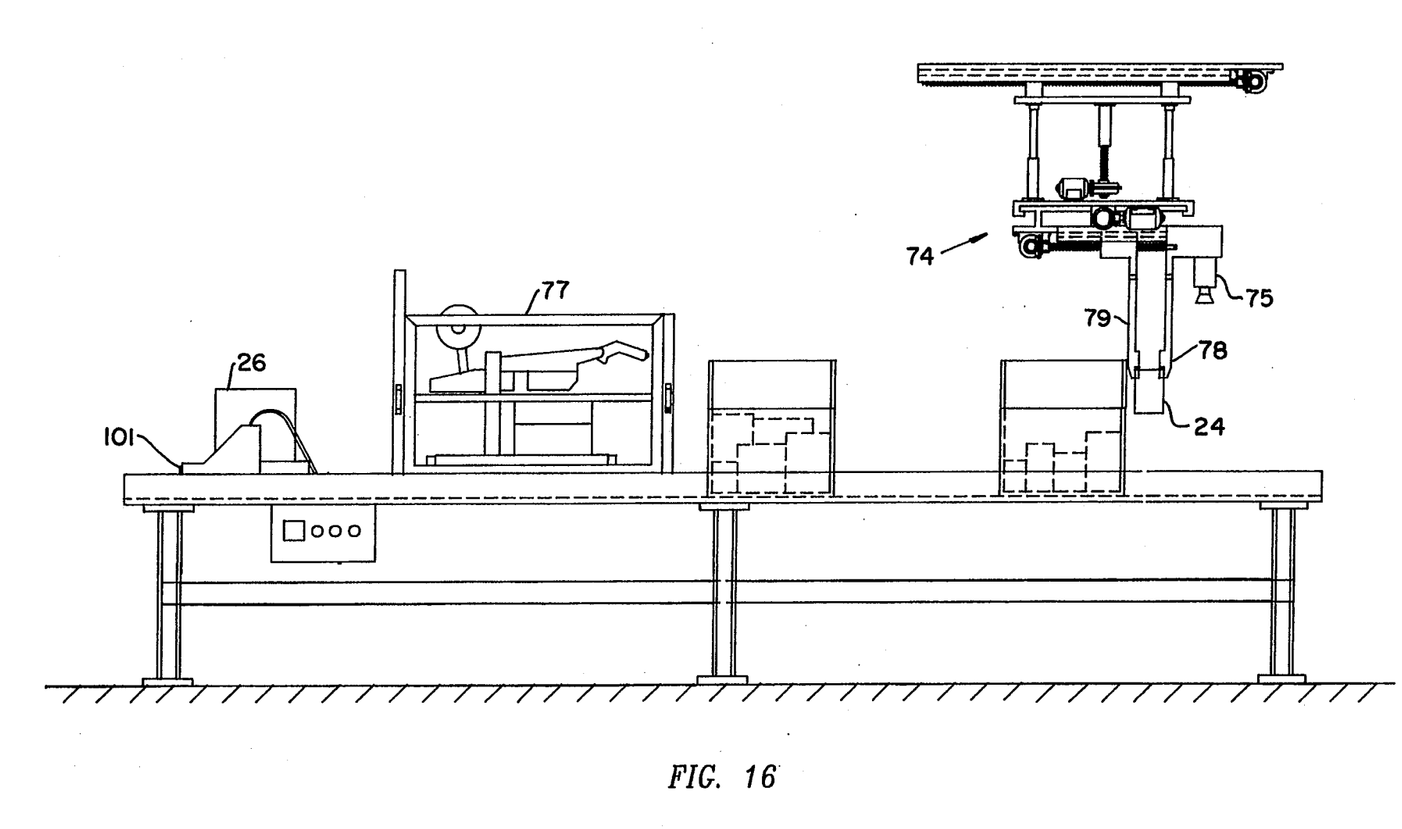
FIG. 16 is an enlarged elevational view of the packaging station of the processing and packaging apparatus of FIG. 1.

During the loading of a carton 96, the computer 26 generates and maintains a map of the interior of the carton 96 from information received from the OIC 75 and shape information in the computer's data files and optimizes the positions of the articles 24 in the carton 96. Articles 24 are positioned and lowered into the carton 96 based on the optimum position as determined by the computer 26.

After a carton loading has been completed, the carton 96 is advanced by the robot arms 78, 79 to the belt conveyor 76 for transport to the carton sealer and order marker 77 where the carton 96 is closed, sealed with tape, and marked with an order number.

Figures 13, 14, 15:
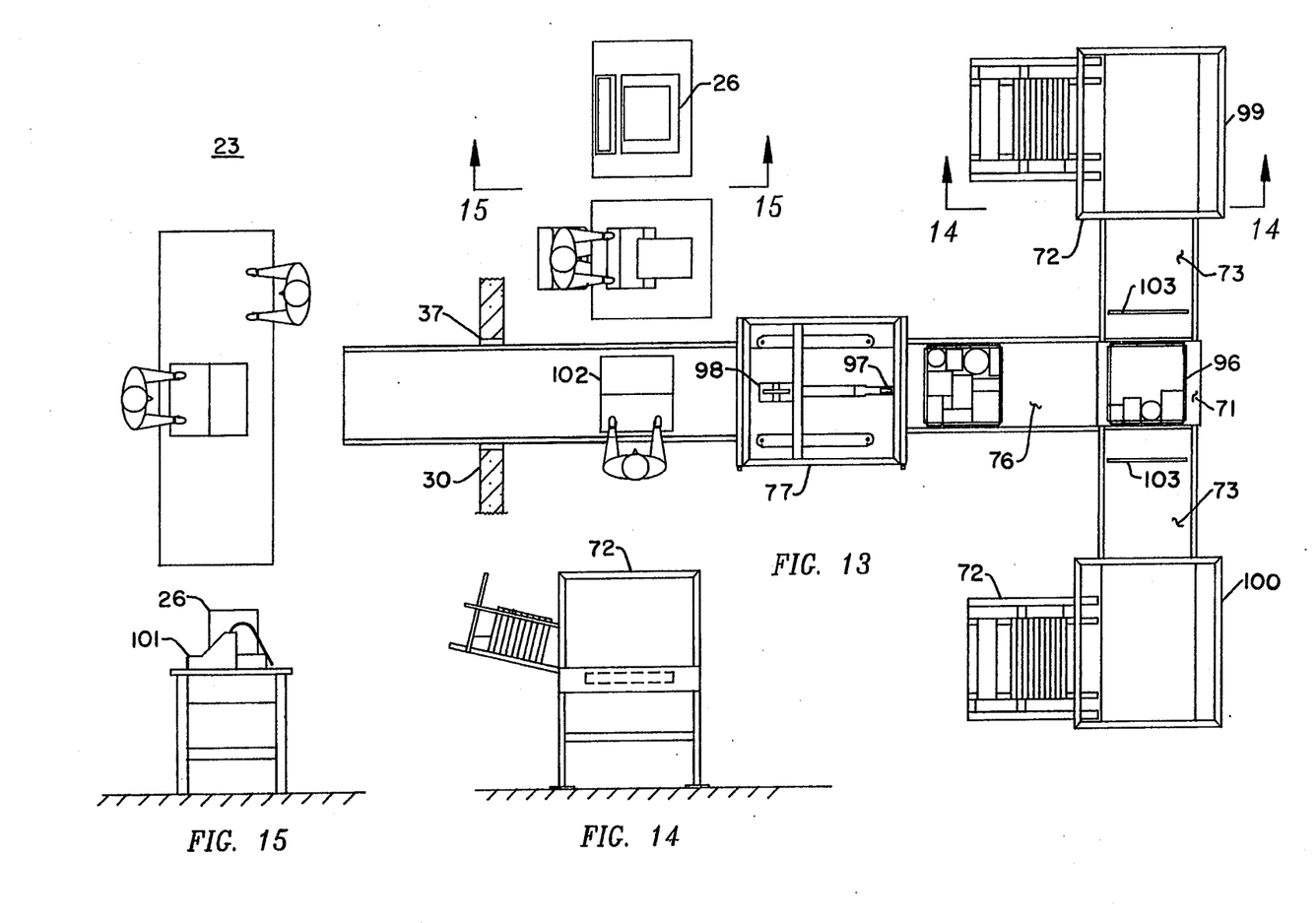
FIG. 13 is a plan view of a pair of carton erecting stations, a carton sealing and order marking station, a computer and a printer.
FIG. 14 is a cross-sectional view taken on the line 14—14 in FIG. 13.
FIG. 15 is a cross-sectional view taken on the line 15—15 in FIG. 13.

As best seen in FIGS. 13 and 16, the carton sealer and order marker 77 is comprised of a conventional automatic case sealer 97 and a print head 98 for marking customer order numbers on cartons. One suitable unit is the 3M-Matic 12RF Random Fully-Automatic Case Sealer manufactured by the Packaging Systems Division of the 3M Company. The 3M Case Sealer is capable of applying tapes of 1½ to 2.00 inches and sealing eight boxes per minute depending upon carton length.

The two carton erectors 72 and corresponding conveyors 73 are arranged on opposite sides of the stationary table 71. One carton erector 99 is used for erecting small size cartons and the other erector 100 is used for erecting large size cartons. Carton selection and movement is controlled by the computer 26. On the empty carton conveyor belts 73 are cleats 103 for maintaining positions of the cartons on the conveyors 73.

The carton erecting stations 99, 100 are the usual units commonly used in packaging lines. One such unit is manufactured by the Durable Packaging Corporation, Chicago, Ill. It is a pneumatically operated unit comprised of a frame, a magazine for storing carton stock, a pneumatically actuated mechanism for feeding stock from the magazine and erecting cartons and a sealer.

After a carton 102 has been loaded and the order number has been applied to the carton, an invoice is generated by the computer 26 and a printer 101. The loaded carton 102 is transported by the conveyor 76 through the opening 37 in wall 30 into the order pick-up zone 23 for payment and pick-up.

ALTERNATE EMBODIMENT

Figure 17:
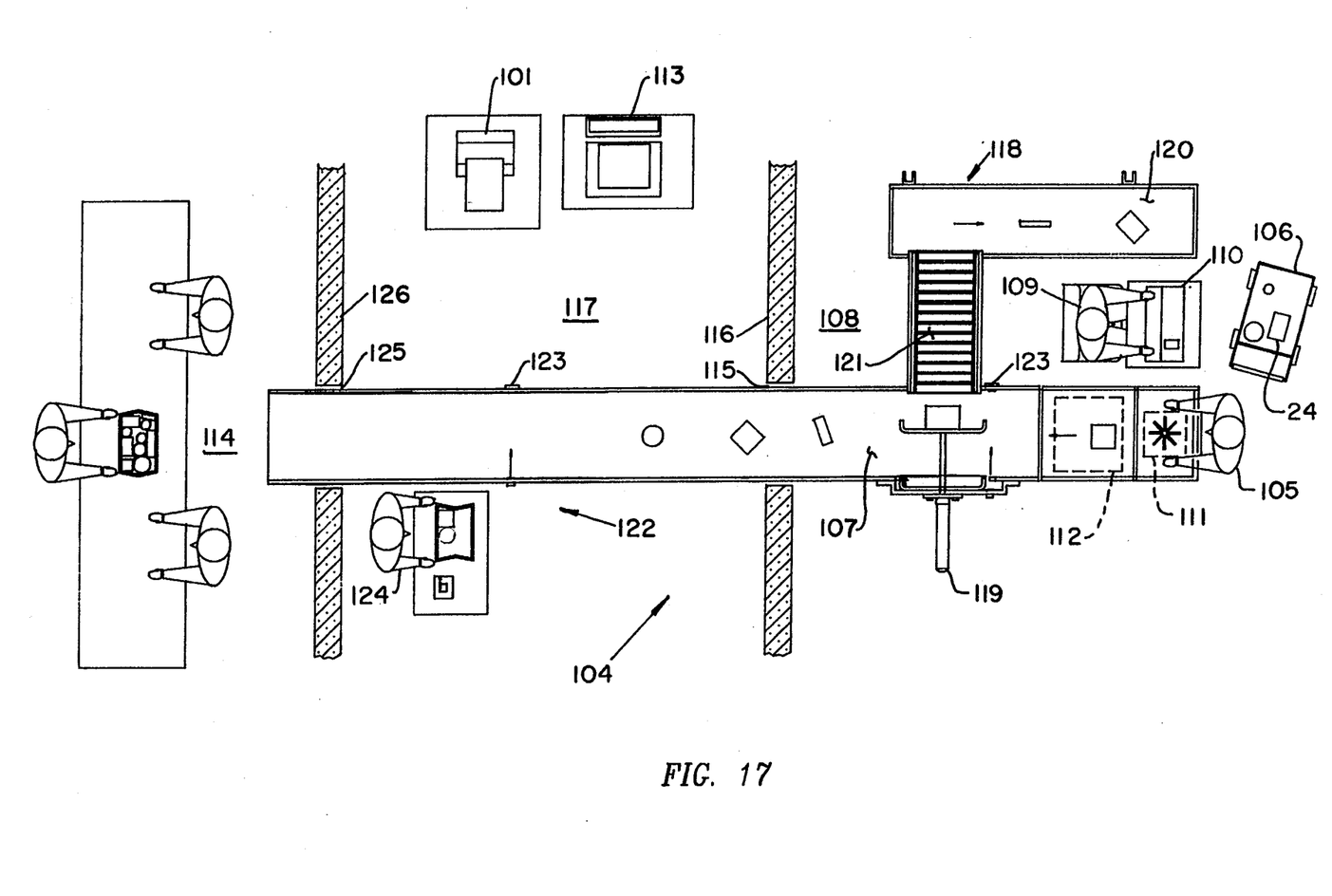
FIG. 17 is a plan view of an alternate embodiment of the present invention.

With reference to FIG. 17, an alternate embodiment 104 is shown having many features of the first embodiment 20. A customer 105 with a shopping cart 106 is shown positioned for loading articles 24 on to a moving belt conveyor 107 for processing and packaging. In a similar manner to the prior embodiment, each article 24 has a bar code 44 which identifies the article's UPC number and a usual type anti-theft strip of foil (not shown) which prevents removal of articles from a public shopping zone.

Opposite the customer 105 an employee 109 is positioned at a terminal 110 which is adapted to collect payments, generate sales slips and control the movement of articles 24 on the conveyor 107. On the conveyor 107 there is an optical bar code scanner 111. The customer passes each article over the scanner 111 with the bar code facing the scanner 111 and deposits the article on a conveyor scale 112.

The article's UPC number is automatically digitized and entered in a computer 113 and used to recall from memory into the computer's central processing unit a data file for the article 24. The computer 113 compensates for rejected unmarked, mismarked, recalled and expired articles at a rejection station 118 and maintains a count of the number of articles being processed in an order.

After the last article 24 is deposited on the conveyor scale 112, the employee 109 presses a button on the terminal 110 which causes the terminal 110 to print a sales invoice and signal the computer 113 that a complete order has entered the system. The employee 109 also places a conventional tag (not shown) on the last article 24 to .identify the order.

The sales invoice has an order number which is used by the customer 105 to identify the order and the customer in a package pick-up segment 114. The sales invoice also informs the customer if any articles 24 have been rejected because of product recalls or expired dates.

The articles 24 pass through an opening 115 in a wall 116 into the packaging segment 117. In the packaging segment 117 articles pass by a rejection station 118 where, if needed, the conveyor 107 stops and recalled and outdated articles are rejected from the conveyor by a pneumatic cylinder 119 on to a rejection tray 120 via a roller conveyor 121.

After articles 24 pass the rejection station 118, they arrive at a packaging station 122 wherein they are packaged in plastic or paper bags. Prior to arriving at the packaging station 122, each article 24 passes two photocell units 123 which sends a signal to the computer 113 which maintains an article count.

When the computer count corresponds to the number of articles of the order, the conveyor 107 stops, the employee 124 removes the tag from the last article and fixes it to the last bag of the order. The bags then move on the belt conveyor 107 through an opening 125 in a wall 126 to a package pick-up zone 127.

From the foregoing, it will be appreciated that my invention provides numerous benefits, including reduced processing and packaging time, reduced theft and reduced cost of doing business. Moreover, my invention also provides an improved means for managing inventory and a means for continuously providing important information to management for managing a business. It will be further understood that a variety of combinations can be developed from the novel and inventive features which have been described herein, by way of example, multiple load conveyors and packaging stations can be provided in my apparatus.

Although only two embodiments of my invention have been illustrated and described herein it is not my intention to limit my invention to these embodiments since other embodiments can be developed by changes in material, substitution and combinations of parts without departing from the spirit thereof.

I claim:

1. An apparatus for packaging random assortments of random size and shaped articles comprising: a group of stations in seriatim for processing and packaging random assortments of random size and shape articles, said stations including, at least one load station for loading and transporting articles of an order to a scanning station, said load station having a means for separating orders; a rejection station, said rejection station including a means for automatically diverting and extracting mismarked, out of date or recalled articles from said order; a scanning station for scanning and entering into a computer indicia marked on each of said random size and shape articles; a packaging station for mechanically loading said articles into packages; and a computer having a program for interacting with said stations to process, reject and package said articles and having a data file corresponding to said indicia marked on each of said articles.

2. The apparatus recited in claim 1 further comprising a means for producing a printed customer invoice for said order.

3. The apparatus recited in claim 1 further comprising said computer's program being adapted to maintain and update sales and inventory records; and a means for producing printed sales and inventory records.

4. The apparatus recited in claim 1 further comprising a weight station for weighing each article of said order.

5. The apparatus recited in claim 1 further comprising a package sealing station.

6. The apparatus recited in claim 5 further comprising a means for identifying said order on packages containing said order.

7. The apparatus recited in claim 1 further comprising an orientation station for angularly orienting each of said articles before loading said articles in a package.

8. The apparatus recited in claim 7 wherein said orientation station comprises a rotary table for changing the angular orientation of each of said articles; an overhead imaging means for interacting with said computer to angularly position said articles; and a means for transporting each of said articles on and off said rotary table.

9. The apparatus recited in claim 1 wherein said stations are divided into three restricted zones, said zones comprising: a public shopping zone which is accessible to the public; an order processing and packaging zone which is not accessible to the public, said order and processing zone including a first wall for separating said order processing and packaging zone from said public shopping zone; and an order pick-up zone which is not accessible from said processing and packaging zone, said pick-up zone including a second wall for separating said pickup zone from said order processing and packaging zones.

10. The apparatus recited in claim 1 further comprising said packaging station having a means for automatically loading each of said articles in a package.

11. The apparatus recited in claim 10 wherein said means for automatically loading articles in a package comprises a pair of arms, said arms having end portions which are adapted to grasp each of said articles, said arms including a fixed arm and a movable arm; a means for moving said movable arm away from and towards said fixed arm to grasp an article; a means for moving said arms in a vertical direction; a means for moving said arms in a longitudinal direction; a means for moving said arms in a lateral direction; and an overhead imaging means for interacting with said pair of arms, said means for moving said arms in vertical, lateral and longitudinal directions and said computer to pick up and load said articles into packages.

12. The apparatus recited in claim 1 further comprising a means for supplying alternate size cartons to said packaging station for loading said articles into packages.

13. The apparatus recited in claim 9 further comprising a means for restricting the removal of articles from a business to said order pick-up zone, said means comprising an anti-theft strip on each of said articles which sets off an alarm if an article is removed from said public shopping zone.

14. An apparatus for packaging random assortments of random Size and shaped articles comprising: a group of stations in seriatim for processing and packaging random assortments of random size and shape articles, said stations including, at least one load station for loading articles of an order; a scanning station for scanning and entering into a computer indicia marked on each of said random size and shape articles, said load station having a means for separating orders; a rejection station for rejecting mismarked, out of date or recalled articles from said order, a packaging station for loading said articles into packages; and a computer having a program for interacting with said stations to process, reject and package said articles and having a data file corresponding to said indicia marked on each of said articles; an orientation station for angularly orienting each of said articles before loading said articles in a package, said orientation station comprising, a rotary table for changing the angular orientation of each of said articles; an overhead imaging means for interacting with said computer to angularly position said articles; and a means for transporting each of said articles on and off said rotary table, said means for transporting each of said articles on and off said rotary table is an overhead transporter, said transporter being comprised of a frame, said frame having a pair of spaced apart sides, a pair of longitudinal belts, each of said belts being rotatively mounted on one of said sides, a plurality of lateral pusher blades, each of said blades having opposite end portions attached to said belts whereby said belts and said pusher blades advance as a unit in a longitudinal direction to transport articles on to and off of said rotary table; and a means for driving said longitudinal belts.

15. An apparatus for packaging random assortments of random size and shaped articles comprising: a group of stations in seriatim for processing and packaging random assortments of random size and shape articles, said stations including, at least one load station for loading articles of an order; a scanning station for scanning and entering into a computer indicia marked on each of said random size and shape articles, said load station having a means for separating orders, said means for separating orders being comprised of a sensor which is a magnetized piece on one of said articles and a sensor mounted in said load station which is responsive to said magnetized piece; a rejection station for rejecting mismarked, out of date or recalled articles from said order, a packaging station for loading said articles into packages; and a computer having a program for interacting with said stations to process and package said articles and having a data file corresponding to said indicia marked on each of said articles.

16. An apparatus for packaging random assortments of random size and shaped articles comprising: a group of stations in seriatim for processing and packaging random assortments of random size and shape articles, said stations including at least one load station for loading articles of an order; a scanning station for scanning and entering into a computer indicia marked on each of said random size and shape articles, said load station having a means for separating orders; a rejection station for rejecting mismarked, out of date or recalled articles from said order, said rejection station comprising a means for weighing articles and a means for diverting articles in said apparatus, said weighing and said diverting means interacting with said scanning station and said computer to reject said mismarked, out of date or recalled articles, a packaging station for loading said articles into packages; and a computer stations to process and package said articles and having a data file corresponding to said indicia marked on each of said articles.

17. An apparatus for packaging random assortments of random size and shaped articles comprising: a group of stations in seriatim for processing and packaging random assortments of random size and shape articles, said stations including, at least one load station for loading articles of an order; a scanning station for scanning and entering into a computer indicia marked on said order comprising an assortment of random size and shape articles, said load station having a means for separating orders; a weighing station for determining the weight of each of said articles; a rejection station for rejecting mismarked, out of date or recalled articles; an orientation station for angularly orienting each of said articles; a packaging station for loading said articles into cartons; a means for supplying cartons to said packaging station; a sealing station for sealing said cartons after the filling of said cartons with said articles; and a computer having a program for interacting with said stations to process and package said articles and having a data file corresponding to said indicia marked on each of said articles.

18. An apparatus for packaging random assortments of random size and shaped articles comprising: a group of stations in seriatim for processing and packaging random assortments of random size and shape articles, said stations including, at least one load station for loading articles of an order; a scanning station for scanning and entering into a computer indicia marked on each article of said order of an assortment of random size and shape articles, said load station having a means for separating orders; a weighing station for determining the weight of each of said articles; a rejection station for rejecting mismarked, out of date or recalled articles; an orientation station for angularly orienting each of said articles; a packaging station for loading said articles into packages, said packaging station including a pair of arms, said arms having end portions which are adapted to grasp each of said articles, a first power screw drive for reducing the distance between said arms to grasp an article, a second power screw drive is for moving said arms in a vertical direction, a third power screw drive for moving said arms in a longitudinal direction, a fourth power screw drive for moving said arms in a lateral direction; and an overhead imaging means for interacting with said power screw drives and a computer to mechanically pick up and load said articles in said packages; a means for supplying cartons to said packaging station; a sealing station for sealing said cartons after the filling of said cartons with said articles; and a computer having a program for interacting with said stations to process and package said articles and a data file corresponding to said indicia marked on each of said articles.

19. The apparatus recited in claim 18 wherein said indicia marked on said articles comprises said articles' UPC numbers in bar code form.

* * * * *

UNITED STATES PATENT AND TRADEMARK OFFICE
CERTIFICATE OF CORRECTION

PATENT NO. : 5,406,770
DATED : April 18, 1995
INVENTOR(S) : Karel J. Fikacek

It is certified that error appears in the above-identified patent and that said Letters Patent is hereby corrected as shown below:

Column 10, line 67, change "Size" to --size--

Column 12, line 3, after computer, insert
    --having a program for interacting with said--

Signed and Sealed this

Twentieth Day of June, 1995

Attest:

BRUCE LEHMAN

*Attesting Officer*  *Commissioner of Patents and Trademarks*